(12) United States Patent
Oda et al.

(10) Patent No.: US 9,686,016 B2
(45) Date of Patent: Jun. 20, 2017

(54) OPTICAL TRANSMISSION APPARATUS, OPTICAL TRANSMISSION SYSTEM, AND CONTROL METHOD OF OPTICAL TRANSMISSION SYSTEM

(71) Applicant: FUJITSU LIMITED, Kawasaki-shi, Kanagawa (JP)

(72) Inventors: Shoichiro Oda, Fuchu (JP); Kentaro Nakamura, Machida (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 14/801,356

(22) Filed: Jul. 16, 2015

(65) Prior Publication Data
US 2016/0036534 A1    Feb. 4, 2016

(30) Foreign Application Priority Data
Aug. 4, 2014    (JP) .................................. 2014-158785

(51) Int. Cl.
| H04B 10/11 | (2013.01) |
| H04B 10/564 | (2013.01) |
| H01S 3/10 | (2006.01) |
| H04B 10/293 | (2013.01) |

(52) U.S. Cl.
CPC ....... H04B 10/564 (2013.01); H01S 3/10015 (2013.01); H04B 10/2935 (2013.01)

(58) Field of Classification Search
CPC .............. H04B 10/564; H04B 10/2935; H01S 3/10015
USPC ....................................................... 398/182
See application file for complete search history.

(56) References Cited

U.S. PATENT DOCUMENTS

| 6,134,034 A | 10/2000 | Terahara |
| 6,229,631 B1* | 5/2001 | Sato .................. H04B 10/0775 398/147 |
| 6,433,864 B1 | 8/2002 | Chung et al. |
| 6,654,561 B1* | 11/2003 | Terahara ............ H04B 10/0799 398/25 |

(Continued)

FOREIGN PATENT DOCUMENTS

| EP | 2 355 388 A2 | 8/2011 |
| JP | 9-261205 | 10/1997 |

(Continued)

OTHER PUBLICATIONS

Extended European Search Report issued Jan. 5, 2016 in corresponding European Patent Application No. 15178462.6.

*Primary Examiner* — Juan A Torres
(74) *Attorney, Agent, or Firm* — Staas & Halsey LLP

(57) ABSTRACT

An optical transmission apparatus includes: an optical amplifier configured to amplify an optical signal; an optical power adjustment unit configured to adjust power of the optical signal output from the optical amplifier; and a controller configured to control an adjustment amount of the optical power in the optical power adjustment unit, in accordance with optical power control information obtained based on output optical power information per wavelength indicating output optical power that the optical amplifier is capable of outputting depending on a number of wavelengths included in the optical signal, and requisite signal quality information in a reception node which is to receive the optical signal output from the optical amplifier.

10 Claims, 13 Drawing Sheets

(56) References Cited

U.S. PATENT DOCUMENTS

| | | | |
|---|---|---|---|
| 2003/0011837 A1 | 1/2003 | Shake et al. | |
| 2004/0208577 A1 | 10/2004 | Cahill | |
| 2008/0080865 A1* | 4/2008 | Muro | H04J 14/0204 398/83 |
| 2009/0214201 A1 | 8/2009 | Oda et al. | |
| 2011/0188851 A1* | 8/2011 | Oda | H04J 14/021 398/26 |
| 2012/0063771 A1 | 3/2012 | Sugaya et al. | |
| 2013/0251365 A1* | 9/2013 | Sone | H04B 17/00 398/38 |

FOREIGN PATENT DOCUMENTS

| | | |
|---|---|---|
| JP | 2009-198364 | 9/2009 |
| WO | 02/080426 A1 | 10/2002 |

* cited by examiner

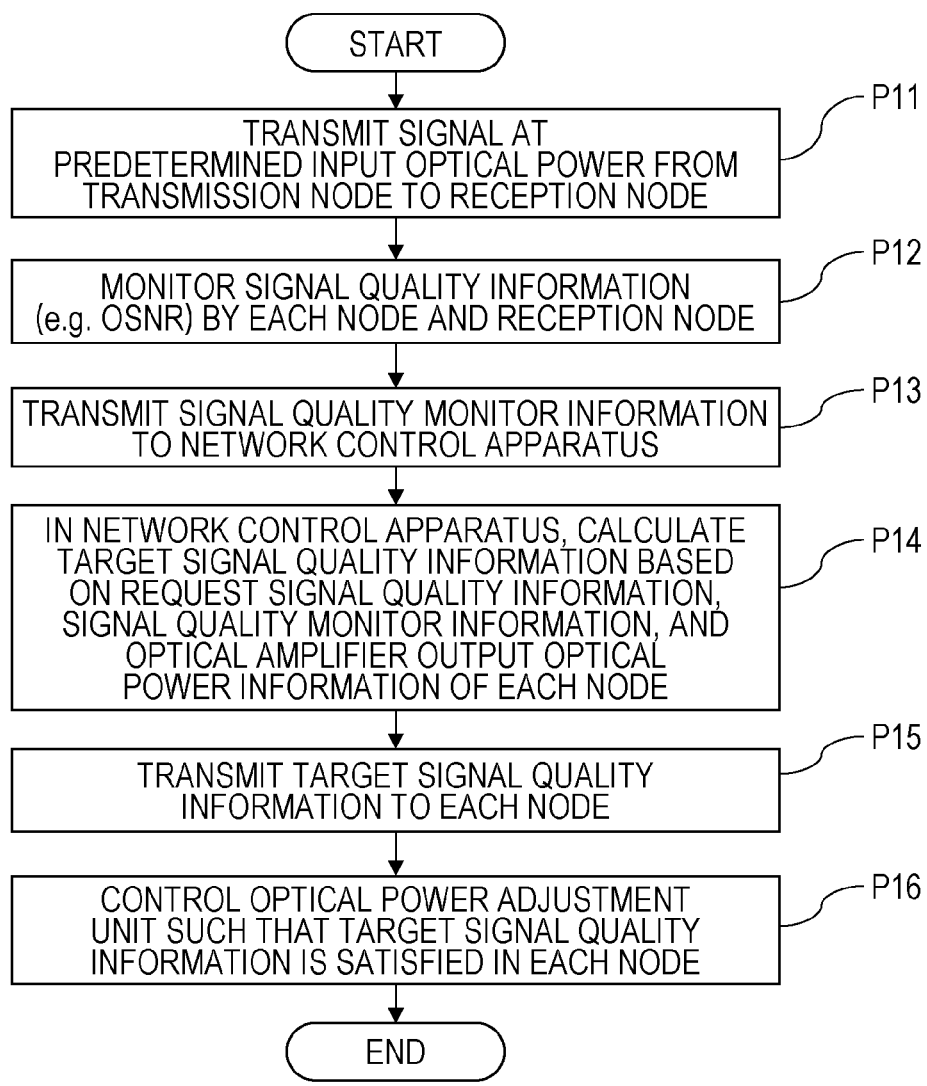

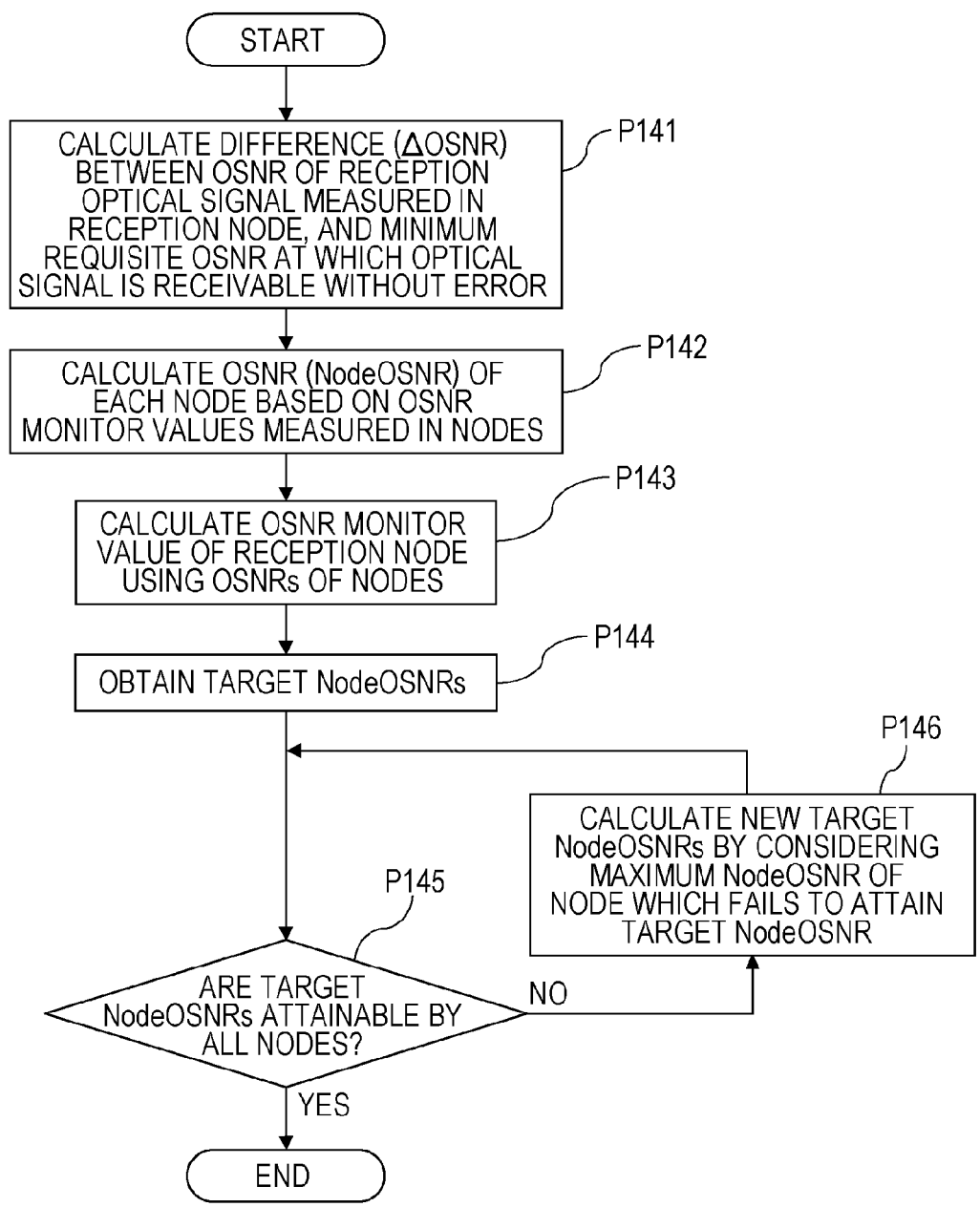

OPTICAL TRANSMISSION APPARATUS, OPTICAL TRANSMISSION SYSTEM, AND CONTROL METHOD OF OPTICAL TRANSMISSION SYSTEM

CROSS-REFERENCE TO RELATED APPLICATION

This application is based upon and claims the benefit of priority of the prior Japanese Patent Application No. 2014-158785, filed on Aug. 4, 2014, the entire contents of which are incorporated herein by reference.

FIELD

The embodiments discussed herein are related to an optical transmission apparatus, an optical transmission system, and a control method of the optical transmission system.

BACKGROUND

In optical communication technologies, studies are in progress on a technologies which implement high-speed and large-capacity optical transmission systems achieving, for example, 100 gigabit/second (Gbps) or more. As examples of such technologies, orthogonal Frequency division multiplexing (OFDM) and Nyquist wavelength division multiplexing (WDM) are known.

In the OFDM, multiple orthogonal optical signals are made orthogonal to each other to reduce inter-signal interferences to the minimum, so that a frequency interval (in other words, wavelength interval) between the optical signals may be narrowed.

Meanwhile, in the Nyquist WDM, transmission data signals to be wavelength-multiplexed are formed into a particular waveform shape (for example, rectangular shape) by using, for example, Nyquist filtering by digital signal processing, so that a wavelength interval in the WDM optical signal may be narrowed.

The use of these technologies makes it possible to form a WDM optical signal super-dense in the wavelength interval, and thereby to improve the frequency usage efficiency in an optical transmission band (may also be referred to as "system band") usable for an optical transmission system.

A technology of the related art is disclosed in Japanese Laid-open Patent Publication No. 09-261205.

With use of a super-dense WDM optical signal, the number of wavelengths (may be referred to as "channels") allocated in an optical transmission band is expected to increase. On the other hand, as for an optical transmission apparatus (may be referred to as "station" or "node") which transmits WDM optical signals, optical power that an optical amplifier provided therein is not infinite. In other words, the output optical power from the optical amplifier is limited.

For this reason, even if the number of channels in a system band is increased using the technology such as the OFDM or the Nyquist WDM which may increase the frequency usage efficiency, a transmittable distance of the WDM optical signal may be limited due to insufficiency of the output optical power from the optical amplifier.

The conventional WDM transmission technology may merely perform a pre-emphasis control of transmission optical power for channels on a transmission node so as to equalize optical signal to noise ratios (OSNRs) of optical signals of multiple channels included in a WDM optical signal received by a reception node.

Accordingly, this technology may fail to optimize the transmission optical power of the optical transmission apparatus provided with the optical amplifier by considering that the output optical power from the optical amplifier may be limited. As a result, constraints occur in the increase in efficiency of the optical transmission. For example, a constraint to the optical transmission distance occurs or a constraint to the number of transmittable channels (may also be referred to as "the number of stored channels") occurs in some cases.

SUMMARY

According to an aspect of the invention, an optical transmission apparatus includes: an optical amplifier configured to amplify an optical signal; an optical power adjustment unit configured to adjust power of the optical signal output from the optical amplifier; and a controller configured to control an adjustment amount of the optical power in the optical power adjustment unit, in accordance with optical power control information obtained based on output optical power information per wavelength indicating output optical power that the optical amplifier is capable of outputting depending on a number of wavelengths included in the optical signal, and requisite signal quality information in a reception node which is to receive the optical signal output from the optical amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart explaining the setting example of the level diagram of the optical transmission system exemplified in FIG. 1;

FIG. 9 is a flowchart explaining an example of a calculation method of a target OSNR in the network control apparatus exemplified in FIG. 1 (target signal quality calculation unit in FIG. 3);

DESCRIPTION OF EMBODIMENTS

Figure 1:
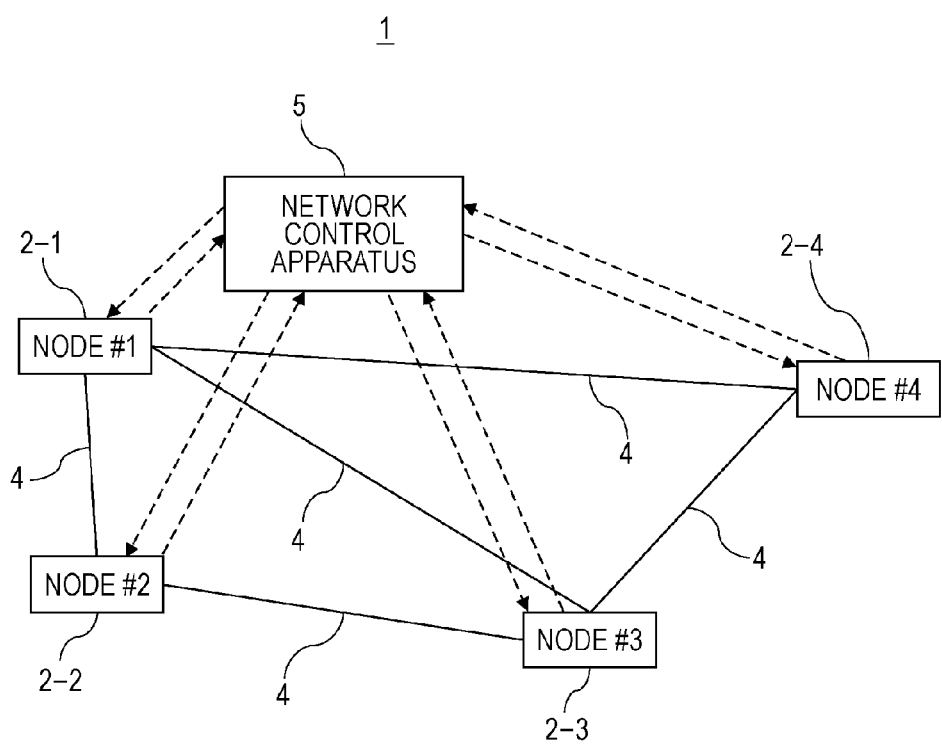
FIG. 1 is a block diagram illustrating a configuration example of an optical transmission system according to one embodiment.

Hereinafter, an embodiment of the present disclosure will be described with reference to the drawings. The embodiment to be described below, however, is merely illustrative and has no intention to exclude the application of various variations and techniques which will not be specified below. Moreover, various illustrative aspects to be described below may preferably be executed in combination therewith as appropriate. Note that, in the drawings used in the following embodiment, the same reference numerals are given to the same or similar portions unless otherwise noted.

FIG. 1 is a block diagram illustrating a configuration example of an optical transmission system according to one embodiment (may also be referred to as "optical network"). An optical network 1 illustrated in FIG. 1 is exemplarily provided with multiple optical transmission apparatuses 2-1 to 2-N (N is an integer of 2 or more, and is 4 in the example of FIG. 1), and a network control apparatus 5 capable of monitoring and controlling the overall optical network 1. Note that, when the optical transmission apparatuses 2-1 to 2-N do not have to be distinguished from one to another, the optical transmission apparatuses 2-1 to 2-N may be expressed as the "optical transmission apparatus 2". The optical transmission apparatus may also be referred to as "station" or "node".

Optical transmission paths 4 connect the nodes 2 to one another. The node 2 is capable of performing optical communication with another node 2 via the optical transmission path 4. The optical communication through the optical transmission path 4 may preferably be communication through wavelength division multiplexing (WDM) light. Accordingly, the optical network 1 may also be referred to as "WDM optical network 1". The optical transmission path 4 is exemplarily an optical fiber transmission path, and may preferably include a pair of optical fiber transmission paths corresponding to bidirectional optical communication.

The connection form between the nodes 2 is not specially limited, and may also be a mesh-like form as exemplified in FIG. 1 or a ring-like form. In other words, the optical network 1 may preferably be a mesh network or a ring network. Alternatively, the optical network 1 may also be a network of another form.

The network control apparatus 5 is connected to the nodes 2 that are elements of the optical network 1 so as to be communicable therewith, and is capable of conducting a supervisory control and the like with respect to the nodes 2 in a concentrated manner.

Figure 2:
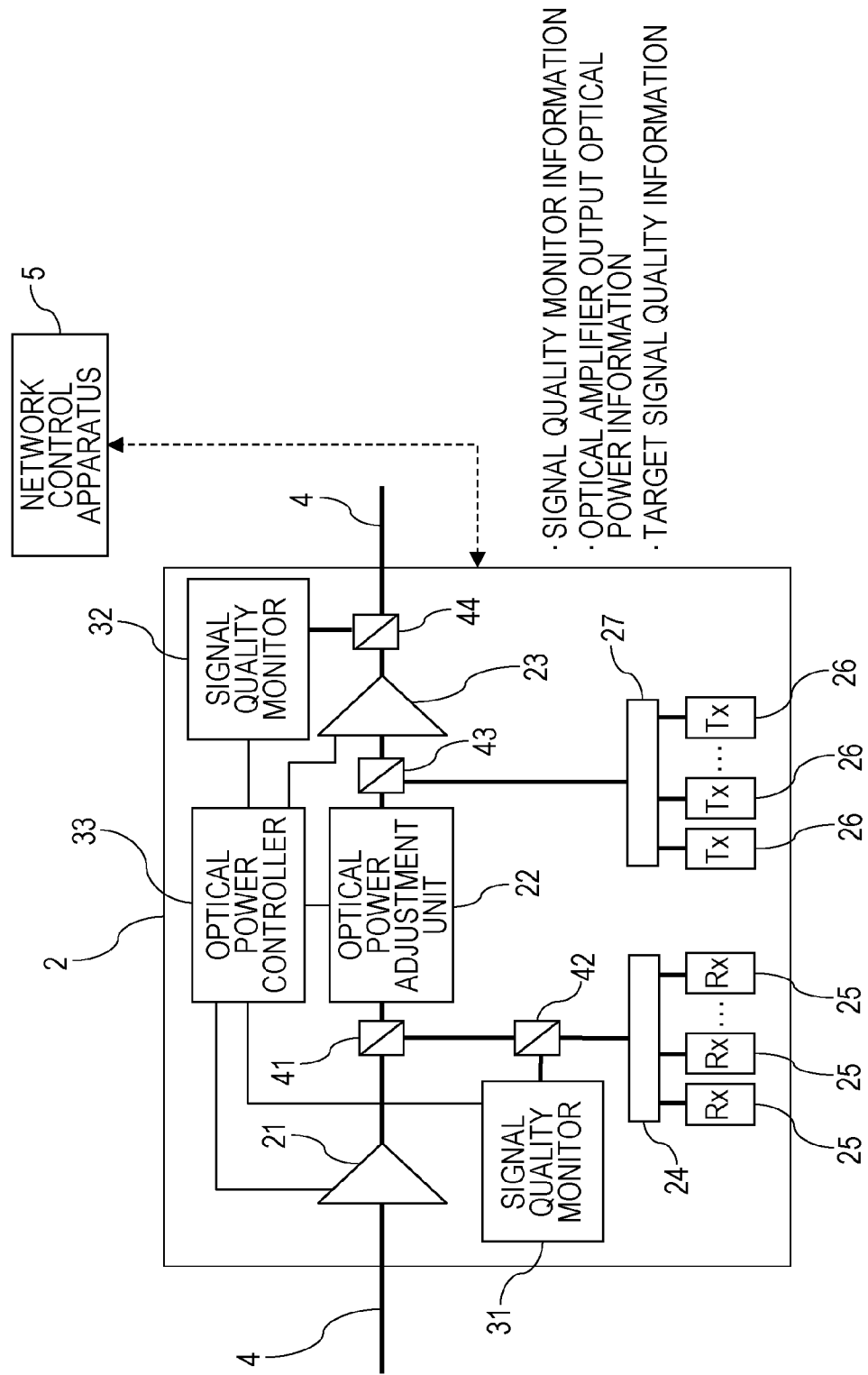
FIG. 2 is a block diagram illustrating a configuration example of an optical transmission apparatus exemplified in FIG. 1.

FIG. 2 illustrates a configuration example of the node 2. The node 2 illustrated in FIG. 2 is exemplarily provided with an optical amplifier 21, an optical power adjustment unit 22, an optical amplifier 23, a wavelength splitter (demultiplexer) 24, optical receivers 25, optical transmitters 26, and a wavelength multiplexer 27.

The optical amplifier 21 amplifies an optical signal (for example, WDM optical signal) received through the optical transmission path 4 at an input side. The optical amplifier 21 may also be referred to as "preamplifier 21" or "reception amplifier 21".

The optical power adjustment unit 22 adjusts (may also be referred to as "controls") the power of a reception optical signal amplified by the preamplifier 21. The power adjustment may preferably be performed on a wavelength (may also be referred to as "channel") basis, for example. The power adjustment on a channel basis may be exemplarily implemented using an optical device capable of varying the attenuation amount (loss amount) of input light on a wavelength basis.

An example such an optical device is a wavelength selection switch (WSS). The WSS exemplarily includes a function of connecting WDM light input into an input port to an output port different for every wavelength, and a function of allowing transmitted optical power (in other words, attenuation amount or loss amount of the light) to be adjusted for every wavelength.

The former function of connecting between the input and output ports may be referred to as "port switch function" or "light switch function". The latter function of adjusting the transmitted optical power may be referred to as "attenuation function". The WSS 22 is an example of a variable optical attenuator (VOA) when the attenuation function is noted.

The light switch function and the attenuation function of the WSS 22 may be exemplarily implemented using an element (may be referred to as "space light modulation element") which may spatially vary a reflection direction of input light (beam) to change an internal optical path.

An example of the space light modulation element includes an element using a liquid crystal on silicon (LCOS) technology or a micro electro mechanical system (MEMS) technology. The space light modulation element adjusts the spatial reflection direction of input light beams to allow the wavelength and the optical power of the light beams gathered to the output port to be adjusted.

Hereinafter, for convenience, the optical power adjustment unit 22 is expressed as "WSS 22" or "VOA 22". The attenuation amount of the WSS (or VOA) 22 is exemplarily varied (controlled) by an optical power controller 33, which is described later.

The optical amplifier 23 amplifies light the power of which is adjusted in the optical power adjustment unit 22 to output (transmit) the light to the optical transmission path 4. The optical amplifier 23 may also be referred to as "post amplifier 23" or may also be referred to as "transmission amplifier 23".

The demultiplexer 24 exemplarily receives part of light input from the preamplifier 21 into the WSS 22, and separates the reception light on a wavelength basis to be input into the optical receivers 25. Therefore, an optical branching coupler 41 is exemplarily provided to an optical path between the preamplifier 21 and the WSS 22.

The optical branching coupler 41 branches the output light from the preamplifier 21 into first branched light and second branched light, and outputs the first branched light into the optical power adjustment unit 22 and outputs the second branched light into the demultiplexer 24. The second branched light may be referred to as "drop light". Note that, the optical branching coupler 41 may also be replaced by a wavelength selection switch (WSS). The WSS 41 may output light of any of wavelengths included in the WDM optical signal to the demultiplexer 24, as drop light.

The optical receiver 25 receives and demodulates the drop light input from the demultiplexer 24. One or a plurality of the optical receivers 25 may preferably be provided in the node 2. The optical receiver 25 may preferably be a coherent optical receiver capable of coherently receiving the drop light.

The coherent optical receiver 25 is capable of selectively receiving light of a wavelength corresponding to local light (may be referred to as "received desired channel") even if the drop light include light of a plurality of wavelengths. When the optical receiver 25 is the coherent optical receiver 25, the demultiplexer 24 may preferably be replaced by an optical branching coupler which branches power of the drop light including light of a plurality of wavelengths to the respective coherent optical receivers 25.

One or a plurality of the optical transmitters 26 are provided in the node 2, and each exemplarily transmit an optical signal (may be referred to as "add light") having a wavelength inserted (added) into light (for example, WDM optical signal) from the WSS 22 to the post amplifier 23.

Therefore, the optical transmitter 26 may preferably be provided with a transmission optical source such as a semiconductor laser diode (LD) or the like, and an optical modulator which modulates light from the transmission optical source with a transmission data signal. The LD may preferably be a tunable LD with a variable light-emitting wavelength.

The multiplexer 27 performs wavelength multiplexing on transmission light (add light) from the optical transmitter 26. The wavelength-multiplexed add light is exemplarily input into an optical multiplexing coupler 43 provided to an optical path between the WSS 22 and the post amplifier 23.

The optical multiplexing coupler 43 multiplexes add light from the multiplexer 27 and output light from the optical power adjustment unit 22, and outputs the multiplexed light to the optical transmission path 4 at an output side. The optical multiplexing coupler 43 may preferably be replaced by a wavelength selection switch (WSS), and the WSS 43 may selectively add the add light from the multiplexer 27 to the output light from the optical power adjustment unit 22 on a wavelength basis.

Meanwhile, as exemplified in FIG. 2, the node 2 may preferably be provided with signal quality monitors 31 and 32, and the optical power controller 33.

The signal quality monitor 31 exemplarily monitors drop light (in other words, output light from the preamplifier 21) which is dropped from the optical branching coupler 41 to the demultiplexer 24. Therefore, an optical branching coupler 42 which branches (may be referred to as "tap") the drop light to the signal quality monitor 31 as monitor light may preferably be provided in an optical path from the optical branching coupler 41 to the demultiplexer 24. Note that, the signal quality monitor 31 may also be referred to as "input light monitor 31" or simply as "monitor 31". Moreover, "monitor" may also be referred to as "detect" or "measure".

A signal quality monitor 32 exemplarily monitors output light from the post amplifier 23. Therefore, an optical branching coupler 44 which branches (taps) the output light from the post amplifier 23 to the signal quality monitor 32 as monitor light may preferably be provided in an optical path from the post amplifier 23 the optical transmission path 4 at the output side. The signal quality monitor 32 may also be referred to as "output light monitor 32" or simply as "monitor 32".

Each of the monitors 31 and 32 is provided with a light receiver, the illustration of which is omitted, (for example, photodetector or photodiode (PD)), and may obtain an electric signal having an amplitude in accordance with power of the monitor light input into the light receiver.

For example, in the input light monitor 31, an electric signal (for example, current value) having an amplitude in accordance with output optical power of the preamplifier 21 may be obtained by the light receiver. Moreover, in the signal quality monitor 32, an electric signal (for example, current value) having an amplitude in accordance with output optical power of the post amplifier 23 may be obtained. The current value may preferably be converted into a voltage value using, for example, a trans-impedance amplifier (TIA).

Accordingly, it may be understood that these electric signals (current value or voltage value) respectively correspond to information (may be referred to as "optical amplifier output optical power information") indicating the output optical power of the optical amplifier 21 and information indicating the output optical power of the optical amplifier 23. The signal quality monitors 31 and 32 may respectively obtain the signal quality of the monitor light, based on the electric signals.

A non-limited example of an index for the signal quality includes an optical signal to noise ratio (OSNR), a value of a quality factor of an optical signal (Q value), a bit error rate (BER), or the like. It may be understood that the Q value is an index representing the degree of deterioration of the waveform of an optical signal. Further, the index for the signal quality is not limited to these. Several types of indexes for the signal quality may also be monitored in a composite manner in the monitors 31 and 32. Note that, the smaller values of the OSNR and Q value represent the lower signal quality, and in contrast, the smaller value of the BER represents the higher signal quality.

The information (may be referred to as "signal quality monitor information") indicating the signal quality obtained in each of the monitors 31 and 32 is exemplarily notified to the optical power controller 33. Note that, optical amplifier output optical power information, in addition to the signal quality monitor information, may also be notified from each of the monitors 31 and 32 to the optical power controller 33.

The optical power controller 33 exemplarily controls the attenuation amount of the optical power adjustment unit 22 based on the signal quality monitor information, the optical amplifier output optical power information, and the target signal quality information in the node 2. The target signal quality information may preferably be notified (may also be referred to as "set") from the network control apparatus 5, exemplarily.

For example, the optical power controller 33 controls the attenuation amount of the optical power adjustment unit 22 such that the signal quality monitor information becomes close to the target signal quality information within a range that the optical amplifier output optical power information falls within an allowable range (for example, limit value).

Note that, the optical power controller 33 may also control, in addition to the control of the attenuation amount of the optical power adjustment unit 22, a gain of either of the optical amplifiers 21 and 23 to satisfy the target signal quality in the node 2.

At least the attenuation amount of the optical power adjustment unit 22 is controlled, so that amplified output optical power of the node 2, in other words, transmission optical power (level) of the node 2 is controlled. Accordingly, it may be understood that the control by the optical power controller 33 corresponds to the control of the transmission optical power level.

The optical power controller 33 may preferably be implemented and mounted by a calculation device having a calculation ability, such as a central processing unit (CPU), a digital signal processor (DSP), an integrated circuit, a field programmable gate array (FPGA), or the like, exemplarily. The calculation device may also be referred to as a computer device or a computer circuit, or may also be referred to as a processor device or a processor circuit.

Figure 3:
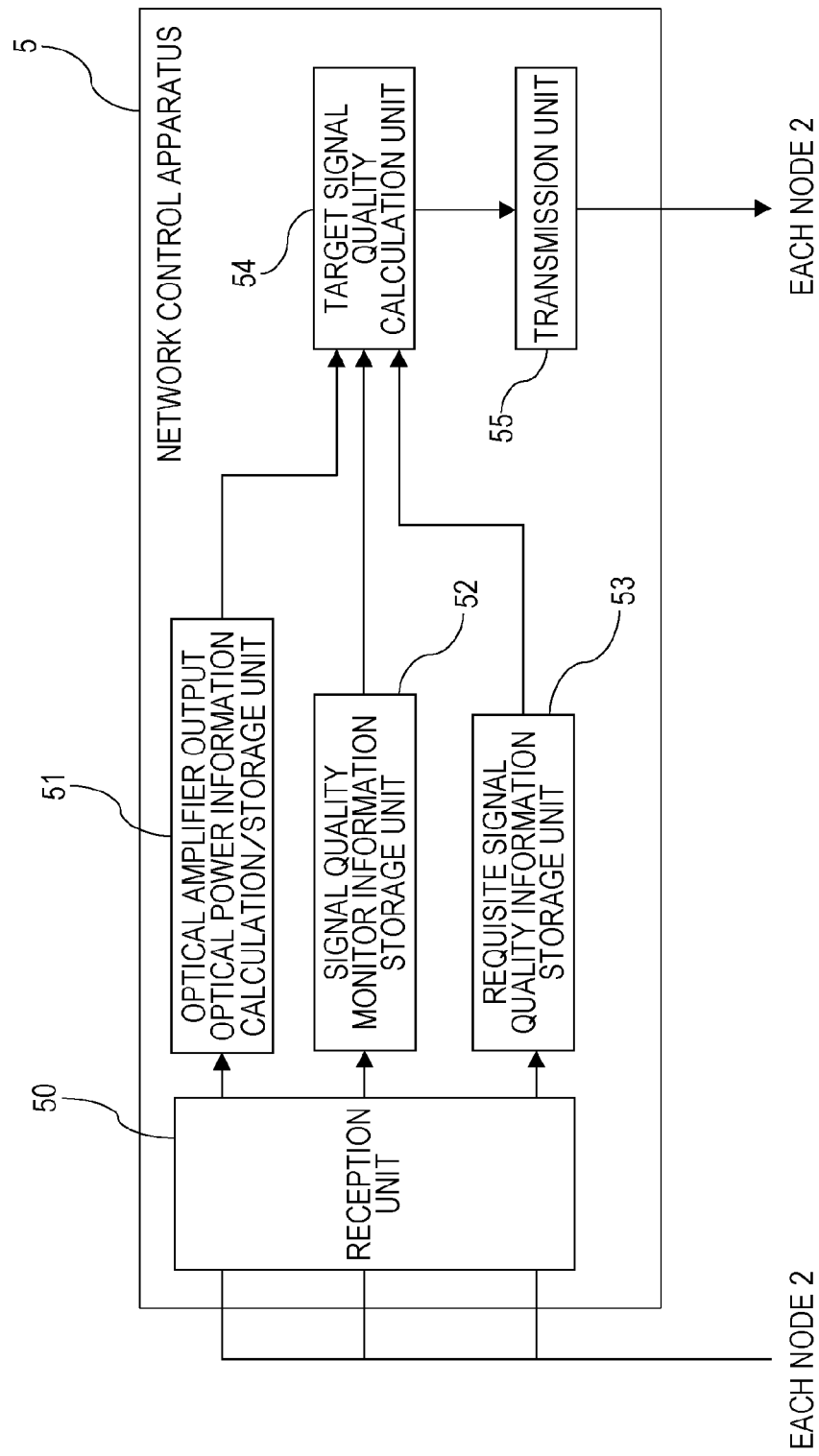
FIG. 3 is a block diagram focused on a functional configuration example of a network control apparatus exemplified in FIG. 1.

The network control apparatus 5 may preferably obtain the target signal quality information of each of the nodes 2 constituting the optical network 1, exemplarily. FIG. 3 illustrates a block diagram focused on a functional configuration example the network control apparatus 5.

The network control apparatus 5 illustrated in FIG. 3 is exemplarily provided with a reception unit 50, an optical amplifier output optical power information calculation/storage unit 51, a signal quality monitor information storage unit 52, a requisite signal quality information storage unit 53, a target signal quality calculation unit 54, and a transmission unit 55.

Each of the storage units 51 to 53 may also correspond to a specific memory, or may also correspond to any storage region in one or multiple memories. The memory is an example of a storage unit or a storage apparatus, and may preferably be a random access memory (RAM), a hard disk drive (HDD), or the like.

The optical amplifier output optical power information calculation/storage unit 51 stores therein optical amplifier output optical power information. The optical amplifier output optical power information may also be information designed in advance (in other words, design value), or may also be information notified from each node 2. Alternatively, the optical amplifier output optical power information calculation/storage unit 51 may also calculate the optical amplifier output optical power information based on the information notified from each node 2.

The notification of information to the network control apparatus 5 by the node 2 may also be performed by the optical power controller 33 in the node 2 exemplified in FIG. 2, or may also be performed by a node controller (illustration is omitted) which involves overall control of the nodes 2.

The signal quality monitor information storage unit 52 stores therein signal quality monitor information monitored in each node 2. The signal quality monitor information may also be notified (received) from the optical power controller 33 in the node 2, or may also be notified from the node controller in the node 2.

The requisite signal quality information storage unit 53 stores therein requisite signal quality information. The requisite signal quality information exemplarily corresponds to minimum signal quality information which enables the node 2 corresponding to a receiving end of an optical path set in the optical network 1 to demodulate an optical signal received through the optical path without error. Note that, the node 2 corresponding to the receiving end may be referred to as "reception node 2".

The reception unit 50 receives the information already stated notified from any of the nodes 2.

The target signal quality calculation unit 54 calculates target signal quality information in the nodes 2 for every node 2 based on the information stored in the storage units 51 to 53. The target signal quality information is exemplarily obtained within a range that optical amplifier output optical power information in the target signal quality information falls within an allowable range.

The acquired target signal quality information is exemplarily transmitted (notified) to the corresponding node 2 via the transmission unit 55. The target signal quality information transmitted to the node 2 may also be, for example, received by the optical power controller 33 in the node 2, or may also be received by the node controller in the node 2 and transmitted to the optical power controller 33.

In each node 2 having received the target signal quality information from the network control apparatus 5, the optical power controller 33 controls a transmission optical power level as the node 2 such that the signal quality monitor information becomes close to the received target signal quality information, as already stated.

Accordingly, it may be understood that target signal quality information which is created by the network control apparatus 5 and transmitted to each node 2 is an example of control information to control the transmission optical power level (in other words, amplified output optical power) of the node 2.

This individually controls (may also be referred to as "adjusts") the output optical power of the nodes 2 which pass through a given optical path so as to satisfy the requisite signal quality in the reception node 2 in the optical path.

In other words, a level diagram illustrating change in optical power (level) in a given optical path may be adjusted per each node 2 so as to satisfy the requisite signal quality of the reception node 2 in the optical path.

Figure 4:
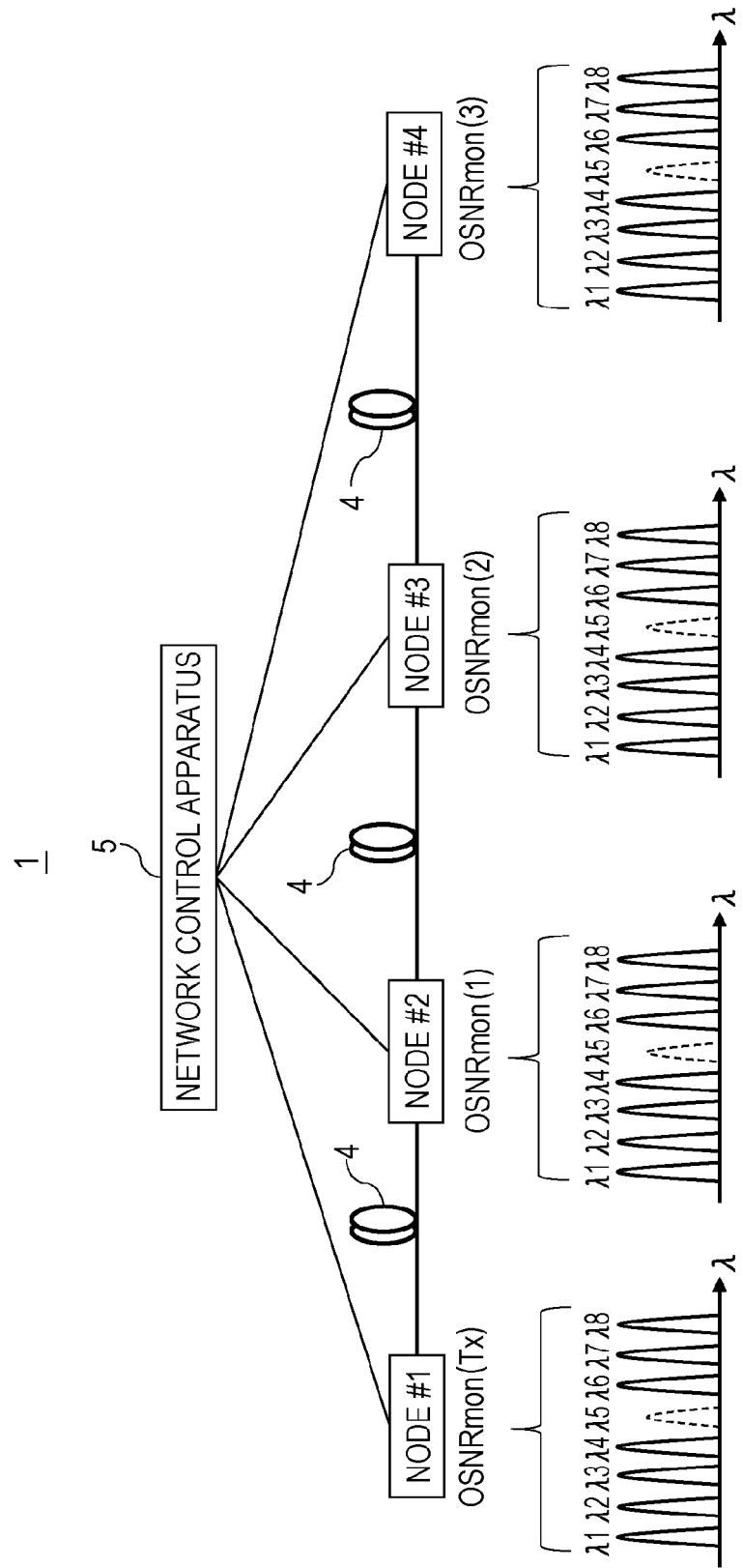
FIG. 4 is a diagram for explaining a setting example of a level diagram of the optical transmission system exemplified in FIG. 1.
Figure 5:
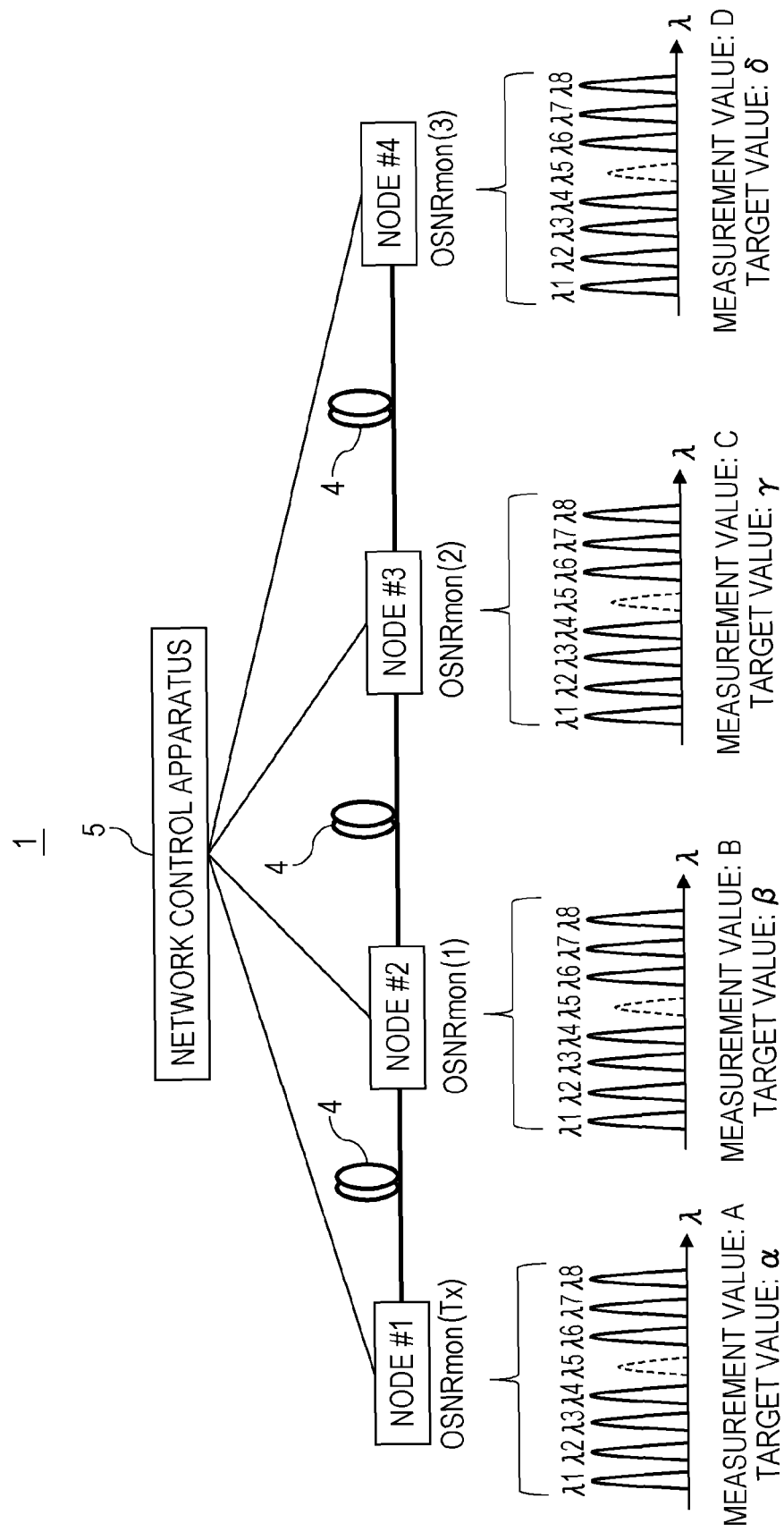
FIG. 5 is a diagram for explaining the setting example of the level diagram of the optical transmission system exemplified in FIG. 1.
Figure 6:
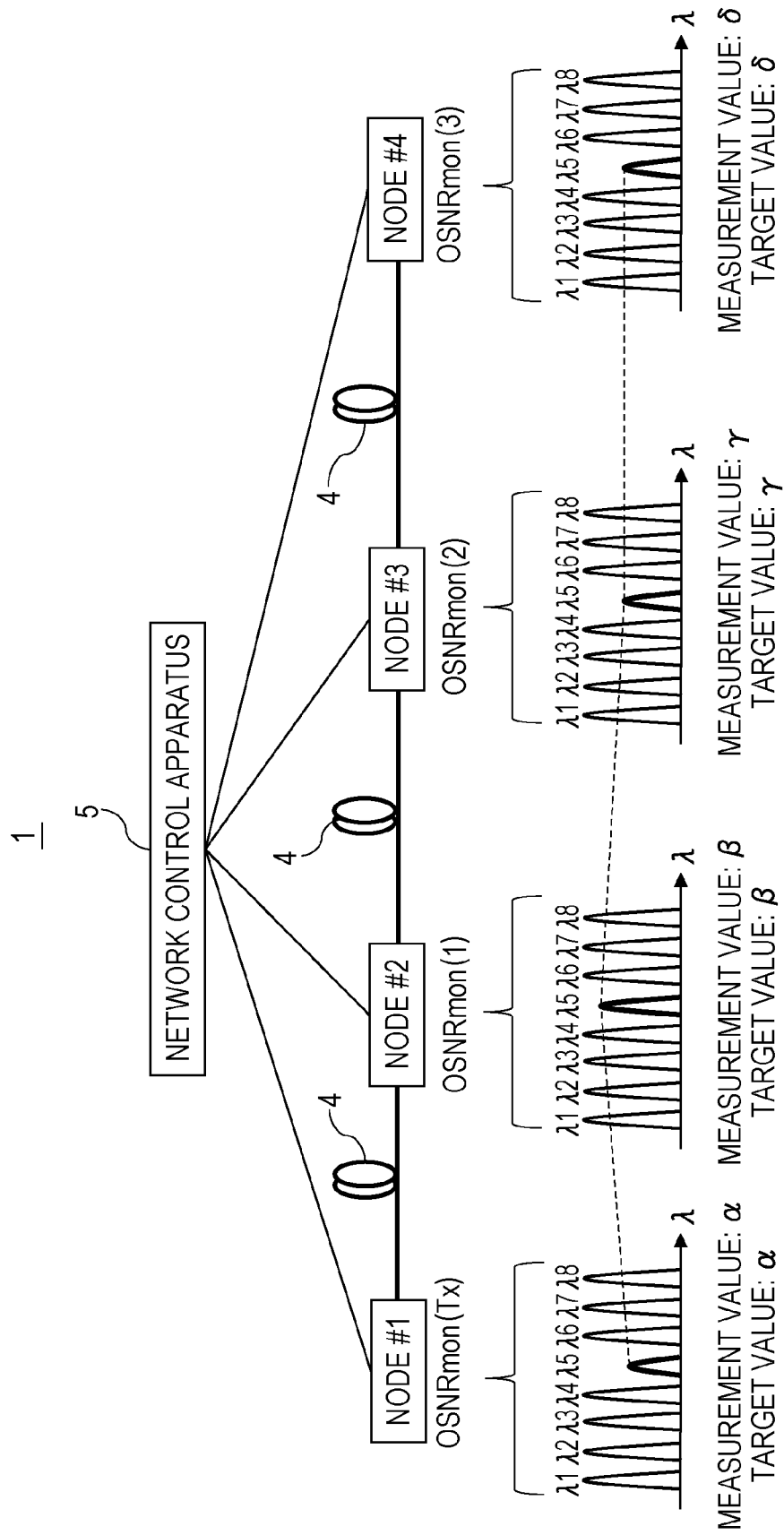
FIG. 6 is a diagram for explaining the setting example of the level diagram of the optical transmission system exemplified in FIG. 1.

An example of adjusting (setting) the level diagram will be described with reference to FIG. 4 to FIG. 7. FIG. 4 to FIG. 6 exemplify a case where an optical path of a wavelength λ5 is additionally set with respect to the nodes 2-1 to 2-4 (#1 to #4). FIG. 7 is a flowchart for exampling the setting example of the level diagram.

Note that, in FIG. 4 to FIG. 6, a Node #1 is a transmission node corresponding to a transmitting end of the optical path of a wavelength λ5 (hereinafter, for convenience, is expressed as "optical path λ5" in some cases). The reception node 2 corresponding to a receiving end of the optical path λ5 may also be a Node #4, or may also be another Node, illustration of which is omitted in FIG. 4 to FIG. 6.

Moreover, hereinafter, a case where the OSNR as an example of the signal quality information is monitored in each node 2 will be described. For example, the OSNR monitored by the transmission Node #1 may be expressed as "OSNRmon(Tx)", and the OSNR monitored by the reception node 2 may be expressed as "OSNRmon(Rx)".

The OSNR monitored by a Node (may be referred to as "relay node") #x (x is any of 1 to N) between the transmission node 2 and the reception node 2 may be expressed as "OSNRmon(x−1)".

For example, the OSNR monitored by a Node #2 may be expressed as "OSNRmon(1)", the OSNR monitored by a Node #3 as "OSNRmon(2)", and OSNR monitored by a Node #4 as "OSNRmon(3)". When the Node #4 corresponds to the reception node 2, "OSNRmon(3)"="OSNRmon(Rx)" is obtained.

Firstly, as exemplified in FIG. 4, the network control apparatus 5 controls each of the Nodes #1 to #4 to set the optical path λ5. Input optical power to the optical path λ5 may also be set so as to be the same or different from one another in the Nodes #1 to #4. After completing the setting, the transmission Node #1 transmits an optical signal at the input optical power to the optical path λ5 to the reception node 2 (operation P11 in FIG. 7).

Subsequently, as exemplified in FIG. 5, each of the Nodes #1 to #4 and the reception node 2 measure the OSNR using the signal quality monitor (may be referred to as "OSNR monitor") 31 or 32 (operation P12 in FIG. 7).

For example, the transmission Node #1 measures "OSN-Rmon(Tx)" (=A) using the OSNR monitor 32 that is an output light monitor. The Nodes #2 to #4 respectively measure "OSNRmon(1)" (=B), "OSNRmon(2)" (=C), and "OSNRmon(3)" (=D) using the OSNR monitors 31 that are input light monitors.

Each of the Nodes #1 to #4 transmits (notifies of) OSNR monitor information that is a measurement value of the OSNR (may also be referred to as "OSNR monitor value"), to the network control apparatus 5 (operation P13 in FIG. 7).

In the network control apparatus 5, as described earlier, the target signal quality calculation unit 54 (see FIG. 3) calculates a target OSNR of each of the Nodes #1 to #4 which satisfies requisite signal quality information in the reception node 2 (operation P14).

Note that, a target OSNR of an Node #x may be expressed as "OSNR(x)target)". In the example of FIG. 5, "OSNR(1)target"=α, "OSNR(2)target"=β, "OSNR(3)target"=γ, and "OSNR(4)target"=δ are obtained. A specific calculation method of a target OSNR is described later.

The network control apparatus 5 notifies the corresponding Nodes #1 to #4 of the calculated target OSNRs, respectively (operation P15 in FIG. 7).

Subsequently, as exemplified in FIG. 6, the Nodes #1 to #4 respectively control the transmission optical power levels such that the OSNR monitor values (A, B, C, and D) match the target OSNRs (α, β, γ, and δ) notified from the network control apparatus 5 (operation P16 in FIG. 7).

Accordingly, the level diagram of the optical path of the wavelength λ5 becomes a state exemplified by dashed line in FIG. 6. In the foregoing manner, by considering the requisite signal quality information in the reception node 2 and an allowable range (it may be understood that there is a "limit") of the optical amplifier output optical power information, transmission optical power levels of the nodes 2 may be individually adjusted.

Figure 8A:
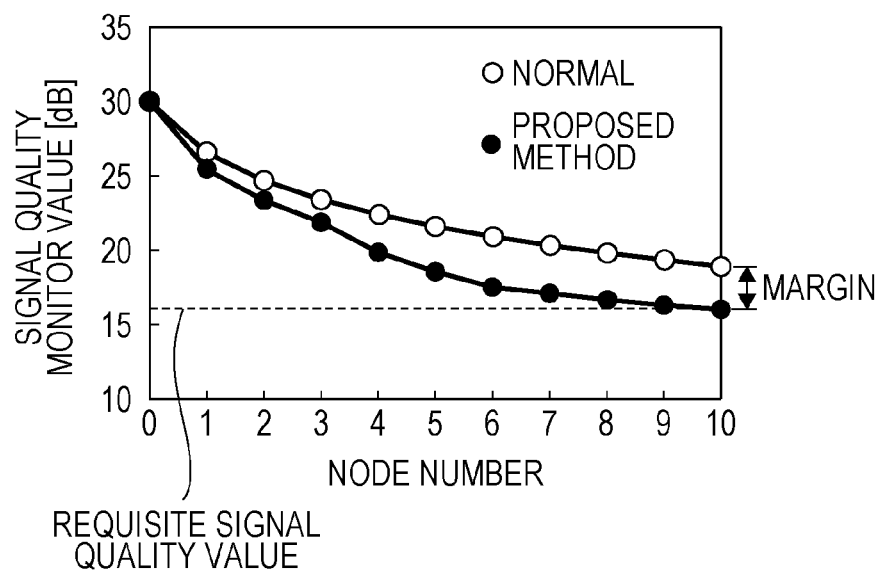
FIG. 8A and FIG. 8B are graphs for explaining the setting example of the level diagram exemplified in FIG. 4 to FIG. 7 by being compared with normal setting.
Figure 8B:
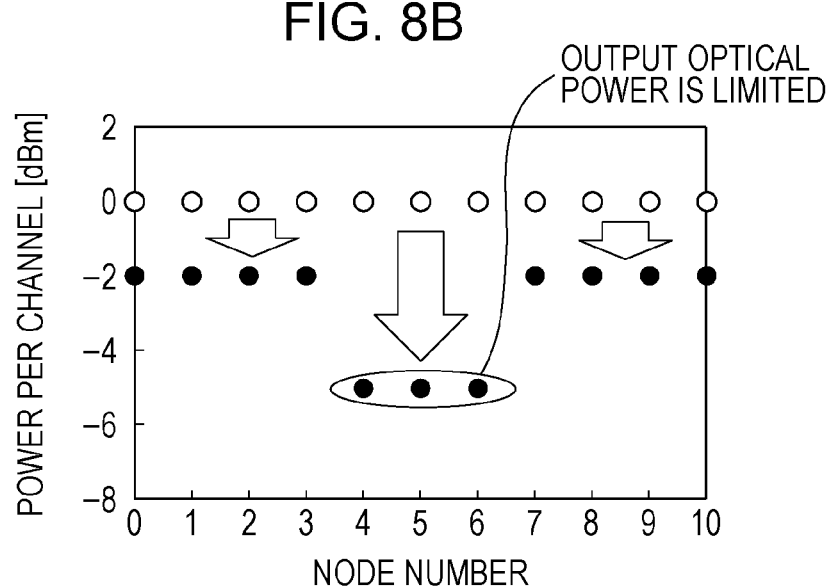

In other words, by considering the limit of the optical amplifier output optical power of each node 2, the level diagram may be optimized in accordance with the transmission distance of the optical signal. FIGS. 8A and 8B illustrate a setting example of the level diagram. FIG. 8A illustrates an example of a relation between the number of nodes through which the optical signal travels (in other words, transmission distance) and signal quality monitor information [dB] in the nodes 2. Moreover, FIG. 8B illustrates an example of a relation between the number of nodes and transmission optical power [dBm] on a channel basis in the nodes 2.

In FIG. 8A and FIG. 8B, a plot of white circle indicates a value when the level diagram is not changed in the nodes 2 (for convenience, may be referred to as "normal case"), and a plot of black circle indicates a value when the abovementioned optimization of the level diagram per node 2 is performed.

As exemplified in FIG. 8A, the optimization of the level diagram per node 2 is possible, so that a surplus margin with respect to requisite signal quality information in the reception Node #10 of a node number=10 may be reduced more than that in the normal case.

Accordingly, the overall target signal quality for the other Nodes #0 to #9 may be lowered in accordance with the reduction in the surplus margin. In accordance with the lowering of the target signal quality, optical amplifier output optical power (in other words, transmission optical power) of each of Nodes #0 to #9 may be lowered.

Moreover, as exemplified in FIG. 8B, optical amplifier output optical power capable of being output (in other words, transmission optical power) is limited in the Nodes #4 to #6 that are parts of the Nodes #0 to #10 in some cases, compared with the other Nodes #0 to #1 and #7 to #9.

Even in such as status, the transmission optical power of the Nodes #0 to #9 is individually optimized by being the limit considered. In other words, within in a range to satisfy the requisite signal quality in the reception node 2, the distribution of the transmission optical power to the Nodes #0 to #9 may be optimized.

As in the foregoing, reduction in a surplus margin of the signal quality requested in the reception node 2 may reduce wasteful consumption of the optical amplifier output optical power in the nodes 2. In other words, increase in efficiency of the optical amplifier output optical power consumption in the nodes 2 may be attained. Accordingly, increase in efficiency of the optical transmission such as extension of a transmittable distance of the optical signal, increase in the number of channels stored in an optical transmission section, or the like may be attained.

First Calculation Method of Target OSNR

Next, an example of a calculation method of a target OSNR in the network control apparatus 5 (the target signal quality calculation unit 54; see FIG. 3) will be described with reference to FIG. 9. Note that, operations P141 to P144 exemplified in FIG. 9 correspond to the processing at the operation P14 in FIG. 7. Moreover, the target signal quality calculation unit 54 exemplified in FIG. 3 may preferably be read as "target OSNR calculation unit 54".

The target OSNR calculation unit 54 calculates a difference (AOSNR) between the OSNR (OSNRmon(Rx)) of a reception optical signal measured in the reception node 2 and a minimum requisite OSNR (ROSNR) at which the optical signal is receivable without error, by an expression 1 below (operation P141).

$$\Delta OSNR = OSNRmon(Rx) - ROSNR \qquad (1)$$

Note that, the requisite OSNR (ROSNR) may preferably include a margin in order to increase the reliability of the optical transmission system 1.

Moreover, the target OSNR calculation unit 54 calculates an OSNR (NodeOSNR) of each node 2 based on the OSNR monitor values (OSNRmon(Tx), OSNRmon(1), . . . , OSNRmon(x−1), and OSNRmon(Rx)) measured in the nodes 2, by an expression 2 below (operation P142). Note that, the OSNR of each node 2 obtained by the expression 2 may be referred to as "node OSNR".

$$NodeOSNR(Tx) = OSNRmon(Tx)$$

$$NodeOSNR(1) = (OSNRmon(1)^{-1} - NodeOSNR(Tx)^{-1})^{-1}$$

-continued $$NodeOSNR(2) = (OSNRmon(2)^{-1} - OSNRmon(1)^{-1})^{-1}$$

...

$$NodeOSNR(N) = (OSNRmon(Rx)^{-1} - OSNRmon(N-1)^{-1})^{-1}$$

Moreover, the target OSNR calculation unit 54 calculates an OSNR monitor value of the reception node 2, in other words, the "OSNRmon(Rx)" in the expression 1, using the OSNR of each node 2 calculated in the abovementioned expression 2, by an expression 3 below (operation P143).

$$OSNRmon(Rx) = (NodeOSNR(Tx)^{-1} + NodeOSNR(1)^{-1} + NodeOSNR(2)^{-1} + \ldots + NodeOSNR(N)^{-1})^{-1} \quad (3)$$

Note that, no limit is present for the processing order of from the operations P141 to 143. Moreover, the operations P141 to 143 may also be processed in parallel.

Subsequently, the target OSNR calculation unit 54 calculates, using the calculation results by the expression 1 and the expression 2, a target OSNR (NodeOSNR(x)target) of each node 2 (#x), by an expression 4 below (operation P144). Note that, the target OSNR of each node 2 may be referred to as a "target node OSNR".

$$NodeOSNR(x)target = NodeOSNR(x) - \frac{\Delta OSNR}{N} \quad (4)$$

$$x = 1, \ldots, N$$

Figure 10:
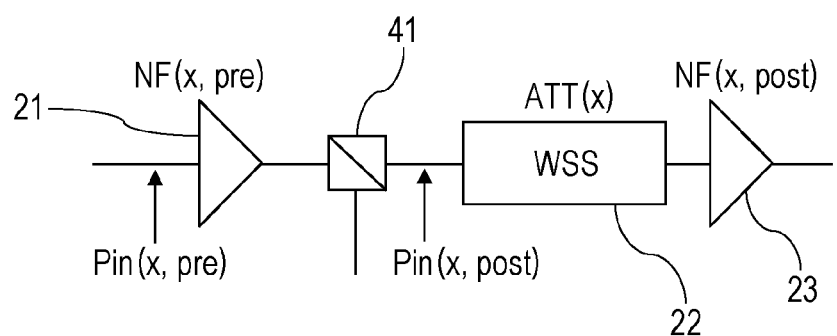
FIG. 10 is a diagram for explaining an example of a parameter used in the calculation method of the target OSNR exemplified in FIG. 9.

Next, the target OSNR calculation unit 54 compares the calculated target OSNR (NodeOSNR(x)target) with a maximum value (NodeOSNR(x)max) of the OSNR attainable by each node 2, and determines whether the target OSNRs are attainable by all the nodes 2 (operation P145). Note that, the maximum value (NodeOSNR(x)max) of the OSNR attainable by each node 2 may be obtained by an expression 5 below (see FIG. 10 in addition).

$$NodeOSNR(x)max = \quad (5)$$

$$\left( \left( \frac{Pin(x, pre)max}{NF(x, pre)h\nu\Delta f} \right)^{-1} + \left( \frac{ATT(x)minPin(x, post)max}{NF(x, post)h\nu\Delta f} \right)^{-1} \right)^{-1}$$

In the expression 5, "NF(x, pre)" represents a noise coefficient of the preamplifier 21 in a Node #x, and "NF(x, post)" represents a noise coefficient of the post amplifier 23 in the Node #x. "Pin(x, pre)max" represents maximum input optical power to the preamplifier 21 in the Node #x, and is exemplarily determined depending on maximum output optical power of the post amplifier 23 in a Node #(x−1) at the front stage, power of other channels and the like.

"Pin(x, post)max" represents maximum input optical power to the post amplifier 23 in the Node #x, and is exemplarily determined depending on maximum output optical power of the preamplifier 21 in the Node #x, power of other channels, nonlinear signal quality deterioration, and the like. These parameters may preferably be included in the optical amplifier output optical power information already stated. Moreover, in the expression 5, "ATT(x)min" represents a minimum value of the attenuation amount set to the WSS 22 in the Node #x, "h" represents a Planck constant, "ν" represents the frequency of a channel, and "Δf" represents a measurement band width.

As a result of the comparison, if all the nodes 2 may implement target OSNRs (NodeOSNR(x)target) (YES at the operation P145), the target OSNR calculation unit 54 transmits the target OSNRs (NodeOSNR(x)target) to the corresponding nodes 2 (operation P15 in FIG. 7).

On the other hand, as the result of the comparison, if the node 2 which fails to attain the target OSNR (NodeOSNR(x)target) is present because the maximum OSNR is smaller than the calculated target OSNR (NO at the operation P145). Such a node 2 is assumed to be set as a Node #j (j is any one of 1 to N).

In this case, the target OSNR calculation unit 54 calculates, by considering the Node #j, a new OSNR monitor value (OSNRmon(Rx)new) of the reception node 2, by an expression 6 below (operation P146).

$$OSNRmon(Rx)new = (NodeOSNR(Tx)^{-1} + NodeOSNR(1)^{-1} + NodeOSNR(2)^{-1} + \ldots + NodeOSNR(j)max^{-1} + \ldots + NodeOSNR(N)^{-1})^{-1} \quad (6)$$

Subsequently, the target OSNR calculation unit 54 calculates, based on a calculation result by the expression 6 and an expression 7 below, new target OSNRs (NodeOSNR(x)new_target) of the nodes, by an expression 8 below.

$$\Delta OSNR' = OSNRmon(Rx)new - ROSNR \quad (7)$$

$$NodeOSNR(x)new\_target = NodeOSNR(x) - \frac{\Delta OSNR'}{N-1}$$

$$x = 1, \ldots, N(\text{excluding } j) \quad (8)$$

In the subsequent operations, until all the nodes 2 may obtain the target OSNRs (until YES is determined at the operation P145), the target OSNR calculation unit 54 repeats the similar processing (recalculation). When final target OSNRs (NodeOSNR(x)final_target) attainable by all the nodes 2 are determined, for example, target OSNRs expressed by an expression 9 below are obtained.

$$OSNR(1)target = (OSNR(Tx)^{-1} + NodeOSNR(1)target^{-1})^{-1} \quad (9)$$

$$OSNR(2)target = (OSNR(1)target^{-1} + NodeOSNR(2)target^{-1})^{-1}$$

...

$$OSNR(N)target =$$

$$(OSNRmon(N-1)target^{-1} - NodeOSNR(N)target^{-1})^{-1}$$

The target OSNR calculation unit 54 transmits the target OSNRs expressed by the expression 9 to the corresponding nodes 2 via the transmission unit 55, as an example of the control information (operation P15 in FIG. 7).

Second Calculation Method of Target OSNR

If the calculation of a target OSNR described above is generalized, the target OSNR calculation unit 54 may preferably solve an objective function expressed by an expression 10 below in accordance with linear programming, for example.

Minimize (10)

$$\left( NodeOSNR(Tx)^{-1} + \sum_{x}^{N} (NodeOSNR(x) - \Delta NodeOSNR(x))^{-1} \right)^{-1} - ROSNR$$

Note that, "NodeOSNR(x)" represents an OSNR in a Node #x, and "ΔNodeOSNR(x)" represents a correction amount of the OSNR in the Node #x.

The target OSNR calculation unit 54 may preferably calculate, from the correction amount (ΔNodeOSNR(x)) obtained by solving the expression 10, a target OSNR (NodeOSNR(x)target) of each node 2 under a constraint condition expressed by an expression 12 below, using an expression 11 below and the expression 9.

$$NodeOSNR(x)\text{target} = NodeOSNR(x) - \Delta NodeOSNR(x) \quad (11)$$

$$NodeOSNR(x) - \Delta NodeOSNR(x) \leq NodeOSNR(x)\text{max} \quad (12)$$

Note that, "NodeOSNR(x)max" in the expression 12 is the same as that expressed in the expression 5. "Pin(x1)max" and "Pin(x2)max" in the expression may also be values determined in advance, or, for example, may also be determined by an expression 13 below, respectively.

$$Pin(x1)\text{max} = \frac{Ptotal\_out(x-1)post - Pused(x-1)post}{Num(free\_ch(x-1))} \cdot \alpha \cdot M \quad (13)$$

$$Pin(x2)\text{max} = \frac{Ptotal\_out(x)pre - Pused(x)pre}{Num(free\_ch(x))}$$

Note that, in the expression 13, "M" represents a type of modulation formats, and is a coefficient determined by the bit rate or the like. For example, M=1 may preferably be set to a non-return-to-zero (NRZ) signal at 10 Gbps, and M=2 may preferably be set to a DP-QPSK signal at 100 Gbps. "DP-QPSK" is an abbreviated name for "Dual Polarization-Quadrature Phase Shift Keying".

Moreover, "Ptotal_out(x)pre" represents maximum output optical power of the preamplifier 21 in a Node #x, and "Ptotal_out(x−1)post" represents maximum output optical power of the post amplifier 23 in a Node #(x−1).

"Pused(x)pre" represents already used power of the preamplifier 21 in the Node #x, and "Pused(x−1)post" represents already used power of the post amplifier 23 in the Node #(x−1).

In addition, "Num(free_ch(x))" represents the number of channels allocatable in the Node #x, "Num(free_ch(x−1))" represents the number of channels allocatable in the Node #(x−1), and a represents a loss of optical fibers used in the optical transmission path 4.

Accordingly, the target OSNR calculation unit 54 may obtain a maximum NodeOSNR based on information on the maximum output optical power of each of the amplifiers 21 and 23, information on the power that each of the amplifiers 21 and 23 currently outputs, and the number of channels currently in use (already allocated). Further, the target OSNR calculation unit 54 may obtain a target OSNR of each node 2 within a range less than the maximum NodeOSNR.

Third Calculation Method of Target OSNR

If the calculation method of a target OSNR described above is expanded to a case of a plurality of wavelengths (WDM), the target OSNR calculation unit 54 may preferably solve an objective function expressed by an expression 14 below in accordance with linear programming, for example.

$$\text{Minimize} \sum_{i} \left( \left( NodeOSNR(k, Tx)^{-1} + \sum_{x}^{N} (NodeOSNR(k, x) - \Delta NodeOSNR(k, x))^{-1} \right)^{-1} - ROSNR(k) \right) \quad (14)$$

Note that, "NodeOSNR(k, Tx)" represents an OSNR (NodeOSNR) in a Node #x of a wavelength (channel) #k, and "NodeOSNR(k, x)" represents an OSNR in the Node #x of the channel #k. "ΔNodeOSNR(k, x)" represents a correction amount of the OSNR (NodeOSNR) in the Node #x of the channel #k.

The target OSNR calculation unit 54 may preferably calculate, from the correction amount (ΔNodeOSNR(k, x)) obtained by solving the expression 14, a target OSNR of each node 2 a constraint condition expressed by an expression 16 below, using an expression 15 below and the expression 9.

$$NodeOSNR(k,x)\text{target} = NodeOSNR(k,x) - \Delta NodeOSNR(k,x) \quad (15)$$

$$NodeOSNR(k,x) - \Delta NodeOSNR(k,x) \leq NodeOSNR(k,x)\text{max} \quad (16)$$

Note that, "NodeOSNR(k, x)max" in the expression 16 may be expressed as an expression 17 below.

$$NodeOSNR(k, x)\text{max} = \left( \left( \frac{Pin(k, x, \text{pre})\text{max}}{NF(k, x, \text{pre})h\nu\Delta f} \right)^{-1} + \left( \frac{ATT(k, x)\text{min}Pin(k, x, \text{post})\text{max}}{NF(k, x, \text{post})h\nu\Delta f} \right)^{-1} \right)^{-1} \quad (17)$$

In the expression 17, "NF(k, x, pre)" represents a noise coefficient for the channel #k of the preamplifier 21 in the Node #x, and "NF(k, x, post)" represents a noise coefficient for the channel #k of the post amplifier 23 in the Node #x. "Pin(k, x, pre)max" represents maximum input optical power for the channel #k of the preamplifier 21 in the Node #x, and is exemplarily determined depending on maximum output optical power of the post amplifier 23 in the Node #(x−1) at the front stage, power of other channels, and the like.

"Pin(k, x, post)max" represents maximum input optical power for the channel #k of the post amplifier 23 in the Node #x, and is exemplarily determined depending on maximum output optical power of the preamplifier 21 in the Node #(x), power of other channels, nonlinear signal quality deterioration, and the like. These parameters may preferably be included in the optical amplifier output optical power information already stated.

The constraint condition in the expression 17 may also be replaced by a constraint condition expressed in an expression 18 below.

$$\sum_{k} Pin(k, x, \text{pre})\text{max} < Ptotal(\text{pre}, x) \quad (18)$$

-continued $$\sum_k Pin(k, x, \text{post})\text{max} < Ptotal(\text{post}, x)$$

Note that, in the expression 18, "Ptotal(pre, x)" represents maximum input optical power of the preamplifier 21 in the Node #x, and "Ptotal(post, x)" represents maximum input optical power of the post amplifier 23 in the Node #x. An optimum value may also be calculated while making the maximum input optical power of each of the amplifier 21 and the amplifier 23 variable depending on a relation with the number of channels.

In the foregoing manner, the target OSNR calculation unit 54 may collectively obtain target OSNRs for a plurality of channels in each Node #x. The Node #x having received the target OSNR controls the attenuation amount of the optical power adjustment unit 22 on a channel #k basis to allow amplified output optical power of each channel #k to be controlled and optimized.

Setting Method of Target OSNR

The optical power controller 33 (see FIG. 2) having received target signal quality information from the network control apparatus 5 controls the attenuation amount of the optical power adjustment unit 22, for example, such that a difference between the received target signal quality information and signal quality monitor information becomes a minimum (or less than a given threshold value).

Figure 11:
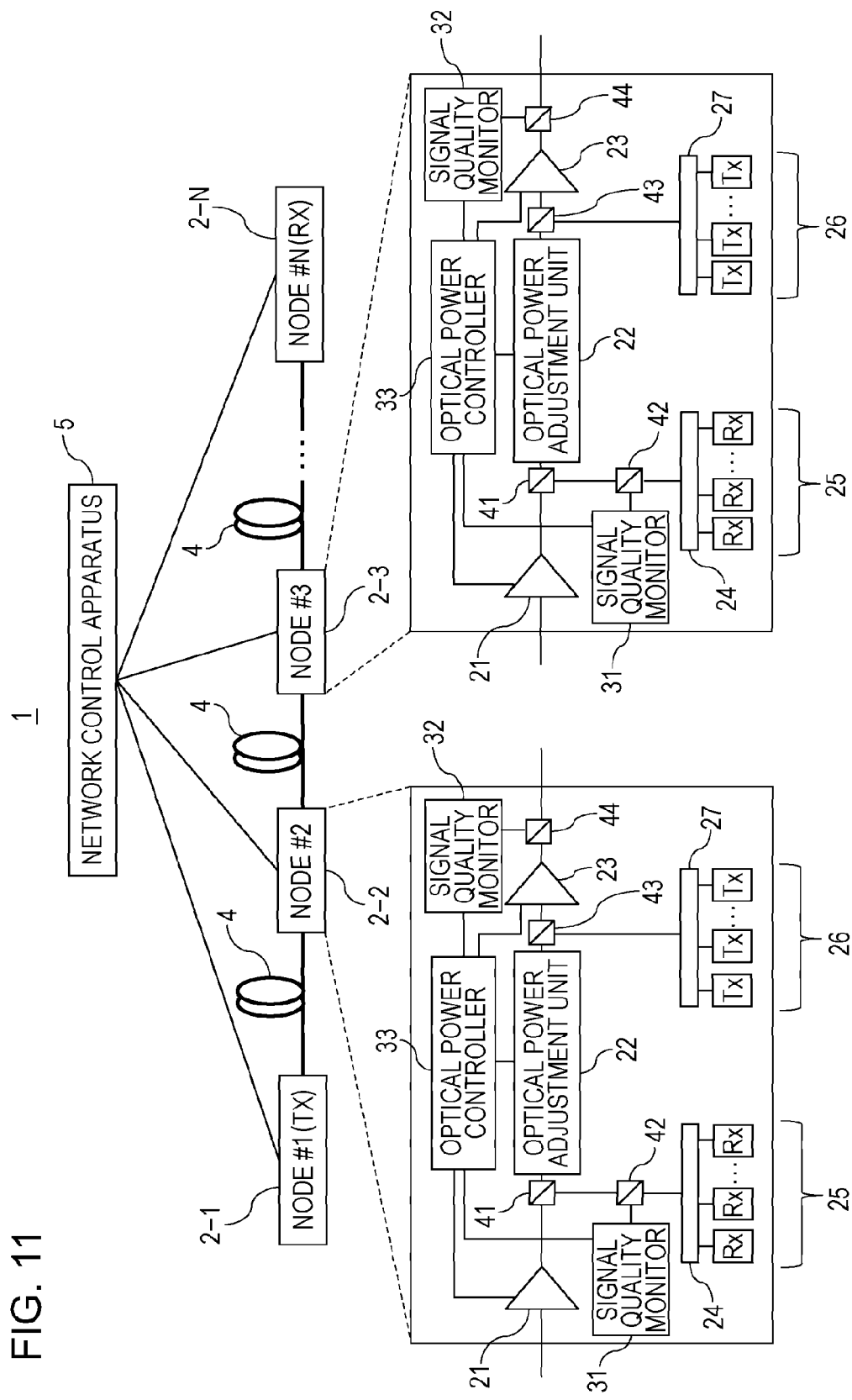
FIG. 11 is a diagram for explaining an example of a setting method of the target OSNR in the optical transmission system exemplified in FIG. 1.

At this time, the network control apparatus 5 may preferably perform setting, for example, as illustrated in FIG. 11, from a transmission Node #0(Tx) toward a reception Node #N(Rx) in an optical path, Node #1→Node #2→Node #3, . . . , Node # (N−1) in this order. Note that, in a case of a mesh network, setting may preferably be performed from the transmission node 2 toward the reception node for every wavelength path in sequence.

In the foregoing manner, the level diagram or the optical network 1 can be optimized for every channel or for every span.

Modification Example

In the example described above, although the case where the OSNR is used as an example of the signal quality has been explained, a Q value or a BER may preferably be used similar to the example described above. For example, in a case where the Q value is used as the signal quality, the requisite OSNR, the target OSNR, and the target node OSNR already stated may preferable be replaced by a request Q value, a target Q value, and a target node Q value, respectively.

Similarly, in a case where a BER is used as the signal quality, the requisite OSNR, the target OSNR, and target node OSNR already stated may preferable be replaced by a request BER, a target BER, and a target node BER, respectively.

For example, when a maximum value (NodeQ(x)max) (maximum node Q value) that is a Q value attainable by a Node #x may preferably expressed by an expression 19 below, using the maximum NodeOSNR (NodeOSNR(x)max) expressed in the expression 5.

$$\text{Node}Q(x)\text{max} = F \cdot \text{NodeOSNR}(x)\text{max} - \gamma Pin(x,\text{post})\text{max} \quad (19)$$

In the expression 19, "F" represents a calibration coefficient which associates the maximum NodeOSNR (NodeOSNR(x)max) with the Q value, and "γ" represents a calibration coefficient which converts input power of an optical fiber used in the optical transmission path 4 into a nonlinear deteriorate amount. As already stated in the expression 5, "Pin(x, post)max" represents maximum input optical power of Node #x to the post amplifier 23, and is exemplarily determined depending on maximum output optical power of the preamplifier 21 in the Node #x, power of other channels, nonlinear signal quality deterioration, and the like.

Note that, any of indexes for the signal quality of the OSNR, the Q value, and the BER may also be combined in a composite manner and used for calculation of target signal quality information.

Configuration Example of Optical Network

Figure 12:
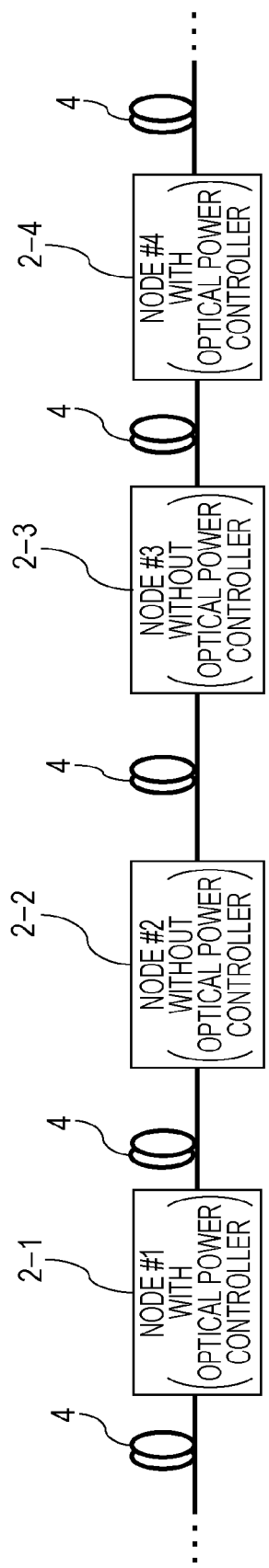
FIG. 12 is a diagram for exemplifying a fact that a node provided with an optical power controller exemplified in FIG. 2 and a node not provided therewith may preferably be present in a mixed manner in the optical transmission system exemplified in FIG. 1.

As exemplified in FIG. 12, multiple nodes 2 constituting the optical network 1 may preferably include the node 2 exemplified in FIG. 2 which is provided with the optical power adjustment unit 22 and the optical power controller 33, and the node 2 which is not provided with the optical power adjustment unit 22 and the optical power controller 33 in a mixed manner. It may be understood that the node 2 which is not provided with the optical power adjustment unit 22 and the optical power controller 33 corresponds to, for example, an optical relay amplification node which relays and amplifies an optical signal received from the optical transmission path 4.

Figure 13:
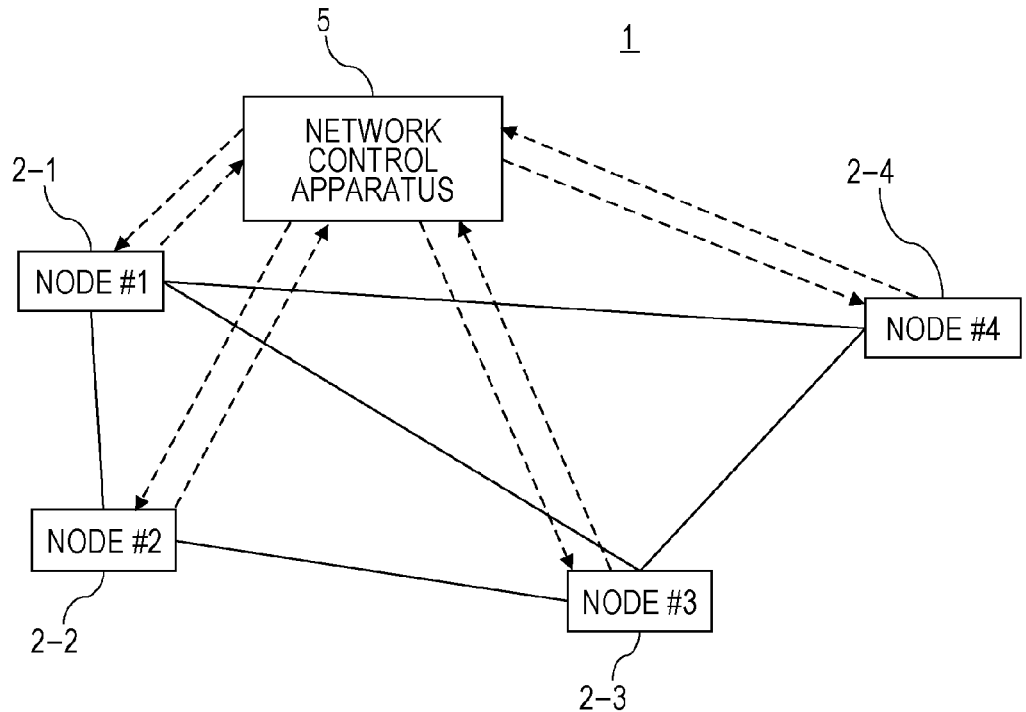
FIG. 13 is a diagram for exemplifying a form where the multiple optical transmission apparatuses exemplified in FIG. 1 are supervisory controlled in a concentrated manner by the network control apparatus.

Moreover, in the already stated example, as schematically exemplified in FIG. 13, signal quality monitor information, optical amplifier output optical power information, and other information are aggregated in the network control apparatus 5, and the target signal quality calculation unit 54 calculates target signal quality information and transmits a calculation result to each node 2.

Figure 14:
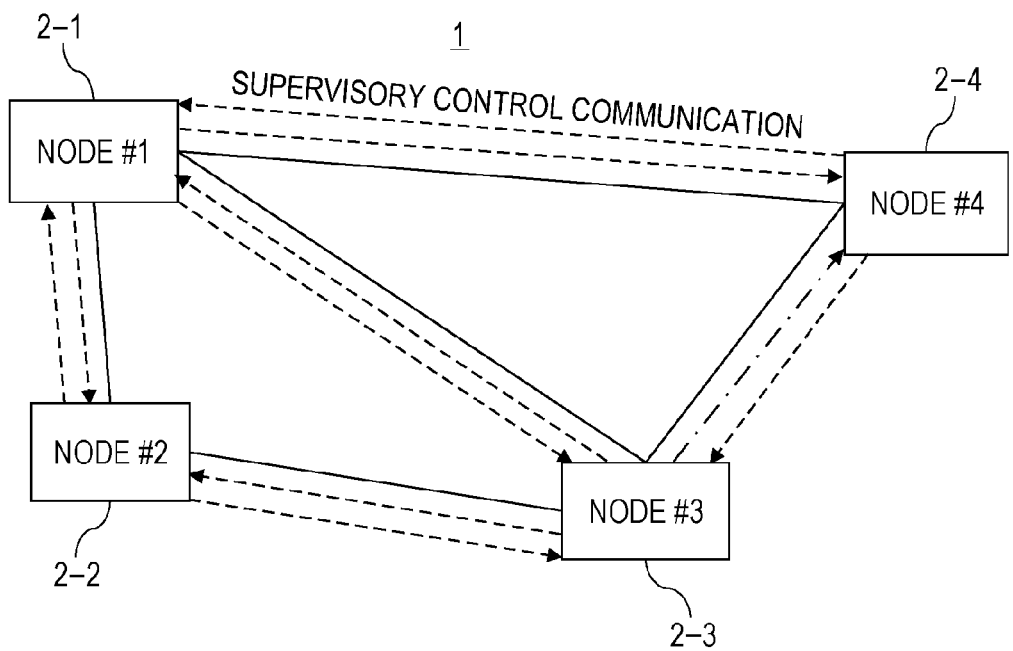
FIG. 14 is a diagram for exemplifying a form where the multiple optical transmission apparatuses exemplified in FIG. 1 are supervisory controlled in a distribution manner with mutual supervisory control communication with one another.

In contrast, as schematically exemplified in FIG. 14, control of a level diagram similar to that in the already stated example may also be conducted by communication among the nodes 2 without using the network control apparatus 5. For example, communication among the nodes 2 is conducted using a supervisory control channel set among the nodes 2 to share signal quality monitor information, optical amplifier output optical power information, or the like among the nodes 2. Moreover, any of the nodes 2 is provided with a calculation unit corresponding to the target signal quality calculation unit 54.

Further, the node 2 (may be referred to as "master node 2") provided with the calculation unit calculates target signal quality information on each node 2 based on share information, and transmits the calculated information to each node 2. This may reduce concentration of loads to the network control apparatus 5. The calculation unit corresponding to the target signal quality calculation unit 54 is provided in the multiple nodes 2 to also allow switching between a currently use and a standby of the master node 2, distribution of loads, or the like.

Note that, although the example where target signal quality information is transmitted to the node 2 has been explained in the already stated example, control information of the optical power adjustment unit 22 in each node 2 created based on the target signal quality information may also be transmitted to the node 2.

For example, each node 2 notifies the network control apparatus 5 (or the master node 2) of signal quality monitor information to allow the network control apparatus 5 (or the master node 2) to create control information of the optical power adjustment unit 22 to minimize a difference between the signal quality monitor information and target signal quality information. Accordingly, the network control apparatus 5 (or the master node 2) may transmit the control information to each node 2.

In other words, the network control apparatus 5 (or the master node 2) may preferably send each node 2 information with which amplified output optical power (for example, the optical power adjustment unit 22) of the node 2 can be controlled so as to satisfy target signal quality information in the node 2.

In still other words, the target OSNR calculation unit 54 may preferably create control information to control amplified output optical power for each node 2 based on output optical power information per wavelength indicting output optical power that the node 2 is capable of amplifying and outputting depending on the number of wavelengths of a WDM optical signal, and requisite signal quality information in the reception node 2. The target OSNR calculation unit 54 may also be referred to as "control information generation unit 54" because the control information may be created.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus, comprising:
   an optical amplifier configured to amplify an optical signal;
   an optical power adjustment unit, including a wavelength selection switch or a variable optical attenuator, configured to adjust power of the optical signal output from the optical amplifier; and
   a controller, including a processor or a circuit that has calculation ability, configured to control an adjustment amount of the optical power in the optical power adjustment unit, in accordance with optical power control information obtained based on output optical power information per wavelength indicating output optical power that the optical amplifier is capable of outputting depending on a number of wavelengths included in the optical signal, and requisite signal quality information in a reception node which is to receive the optical signal output from the optical amplifier.

2. The optical transmission apparatus according to claim 1, further comprising a monitor configured to monitor quality of the optical signal output from the optical amplifier,
   wherein the controller controls the adjustment amount of the optical power such that a difference between signal quality information monitored by the monitor and target signal quality information included in the optical power control information becomes a predetermined threshold value or below.

3. The optical transmission apparatus according to claim 1, wherein the signal quality information is any of an optical signal to noise ratio, a bit error rate, and a Q value of the optical signal.

4. The optical transmission apparatus according to claim 2, wherein
   the controller receives the target signal quality information from a control apparatus which creates the optical power control information, the control apparatus obtaining the target signal quality information for each of optical transmission apparatuses including the optical transmission apparatus based on the requisite signal quality information and the output optical power information on optical amplifiers provided in the optical transmission apparatuses.

5. The optical transmission apparatus according to claim 4, wherein
   the target signal quality information is information that the control apparatus obtains, based on the output optical power information on the optical transmission apparatuses, in a range at or below a maximum value of the target signal quality information attainable by each of the optical transmission apparatuses.

6. An optical transmission system, comprising:
   a plurality of optical transmission apparatuses each including an optical amplifier and configured to amplify and output an optical signal;
   a reception node, including an optical receiver, configured to receive the output optical signal; and
   a control apparatus, including a processor or a circuit that has calculation ability, configured to individually control amplified output optical power of each of the optical transmission apparatuses based on requisite signal quality information in the reception node and output optical power information per wavelength, for indicating output optical power that the optical transmission apparatus is configured to amplify and output depending on a number of wavelengths included in the optical signal.

7. The optical transmission system according to claim 6, wherein
   the control apparatus obtains target signal quality information for each of the optical transmission apparatuses based on the requisite signal quality information in the reception node and the output optical power information per wavelength, for indicating the output optical power that each of the optical transmission apparatuses is configured to amplify and output, and transmits the target signal quality information to the corresponding optical transmission apparatus, and
   each of the optical transmission apparatuses controls the amplified output optical power so as to satisfy the target signal quality information received from the control apparatus.

8. The optical transmission system according to claim 6, wherein
   the signal quality information is any of an optical signal to noise ratio, a bit error rate, and a Q value of the optical signal.

9. The optical transmission system according to claim 7, wherein
   the control apparatus obtains a maximum value of the target signal quality information attainable by each of the optical transmission apparatuses based on the output optical power information per wavelength, for indicating the output optical power that each of the optical transmission apparatuses is configured to amplify and output, and obtains the target signal quality information in a range at or below the maximum value.

10. A control method of an optical transmission system which includes a plurality of optical transmission apparatuses each configured to amplify and output an optical signal, and a reception node configured to receive the output optical signal, the control method comprising:
    creating control information to control amplified output optical power for each of the optical transmission apparatuses, based on requisite signal quality information in the reception node and output optical power information per wavelength, for indicating output optical power that each of the optical transmission apparatuses is configured to amplify and output depending on a number of wavelengths included in the output optical signal; and transmitting the control information to the corresponding optical transmission apparatus.

\* \* \* \* \*